United States Patent [19]

Dreyer, Jr.

[11] Patent Number: 4,989,948
[45] Date of Patent: Feb. 5, 1991

[54] REFLECTIVE SHEETING MATERIAL
[75] Inventor: John F. Dreyer, Jr., St. Paul, Minn.
[73] Assignee: Minnesota Mining and Manufacturing Company, Saint Paul, Minn.
[21] Appl. No.: 348,817
[22] Filed: May 8, 1989
[51] Int. Cl.$^5$ .............................................. G02B 5/12
[52] U.S. Cl. ..................................... 350/97; 350/612; 350/286; 362/346
[58] Field of Search .................. 350/97, 100, 101, 102, 350/103, 109, 286, 613, 321, 612, 631, 171; 362/341, 342, 343, 346, 362, 7, 17

[56] References Cited

U.S. PATENT DOCUMENTS

| | | | |
|---|---|---|---|
| 3,671,101 | 6/1972 | Finch | 350/109 |
| 3,806,232 | 4/1974 | Gray | 350/613 |
| 4,260,220 | 4/1981 | Whitehead | 350/96.28 |
| 4,360,863 | 11/1982 | Barnes et al. | 362/346 |
| 4,468,094 | 8/1984 | Inokuchi | 350/612 |
| 4,615,579 | 10/1986 | Whitehead | 350/96.1 |
| 4,712,867 | 12/1987 | Malek | 350/103 |
| 4,750,798 | 1/1988 | Whitehead | 350/96.10 |
| 4,805,984 | 2/1989 | Cobb, Jr. | 350/96.28 |

FOREIGN PATENT DOCUMENTS 225123 6/1987 European Pat. Off. .
290266 11/1988 European Pat. Off. .

Primary Examiner—Bruce Y. Arnold
Assistant Examiner—Loha Ben
Attorney, Agent, or Firm—Donald M. Sell; Walter N. Kirn; Douglas B. Little

[57] ABSTRACT

The invention provides a reflective sheeting material having a structured reflective surface having a linear ray of isosceles prism reflecting elements, each element including a pair of reflective surfaces at an angle of about 120° therebetween. The invention also provides a reflective sheeting material having a structured reflective surface comprising an array of reflecting elements, each comprising a polyhedron having three paralellogram faces. The invention also provides an apparatus such as a light pole for transporting light and reflecting the light in a broad, uniform pattern. The apparatus comprises (a) a columnar light conduit, for transporting light therealong, the conduit having a proximate end and a distal end; (b) a light source provided at the proximate end of the light conduit, and (c) a light distributing reflective member, such as the reflective sheeting material described above, comprising a multiplicity of repeating reflecting elements. The reflective member is positioned at the distal end of the light conduit so that the light exiting the distal end of the conduit is reflected in a broad, uniformly distributed pattern.

23 Claims, 3 Drawing Sheets

REFLECTIVE SHEETING MATERIAL

TECHNICAL FIELD

The present invention is directed to an apparatus for transporting and reflecting light, particularly to a light pole adapted to reflect light in a broad, uniformly distributed pattern. The present invention is also directed to a reflective sheeting material for use in an apparatus for transporting and reflecting light.

BACKGROUND OF THE INVENTION

The illumination of roadways, parking lots, outdoor sports facilities, and the like, is typically accomplished by means of directed light sources suspended at the top of tall poles. For example, light poles are commonly found uniformly positioned along city streets and highways.

A light pole typically includes a light source suspended at the top of a tall pole, typically 15 to 18 meters above the ground. A light is typically encased in a fixture having reflective and/or refractive portions used to direct the light to the ground below in a desired pattern. The fixture may also include a transformer or ballast, wiring, and other components necessary to provide a bright directed source of light at the top of a pole. The light and fixture typically are very heavy. Accordingly, to suspend the light and the light fixture, a heavy pole, typically made of a heavy gauge metal, is required.

Light poles are positioned at uniform intervals, for example, along a highway or other roadway. The brightness of the light source, the characteristics of the reflectors and/or refractors contained in the fixture, the height that the light source is positioned above the ground, and the distance between adjacent light poles, all contribute to the intensity and pattern of the light illuminating the ground or other surface surrounding the pole. The uniformity of the light illuminating the ground is quantified by the ratio of illumination, defined as the ratio between the brightest spot and the darkest spot. A 7:1 ratio of illumination is considered fairly uniform, while ratios of 100–1000:1 are not uncommon. A ratio of illumination of less than 3:1 would be highly desirable.

Standard light poles, having a directed light source suspended a the ground, present problems involving cost, maintenance, and safety. Because of the materials required to suspend the heavy light and fixture above the ground, the cost of such light poles can be significant. Maintenance of such light poles is also costly and time consuming. To change a light bulb in a suspended light fixture, it is necessary to use a lifting device, such as a telescoping man lift or hoist, attached to a highway maintenance vehicle. In addition to the cost of the two or three persons necessary to operate the lift truck, the presence of such a vehicle on the side of a roadway can be dangerous, both to the maintenance personnel and to the motorist. The presence of the poles themselves along a roadway also presents the danger of the pole being struck by a motorist. Because such poles are typically heavy gauge metal, the impact with such a pole can have severe consequences. In addition, the heavy light fixture and the heavy metal pole, present a significant danger in falling subsequent to impact by a vehicle.

In a different technical field, light conduits capable of transmitting large quantities of light energy from one place to another are known. Such light transmitting conduits are useful in a wide variety of applications, for example, in transmitting sunlight from outdoors into the interior of a room. Such light conduits typically operate on the principle of total internal reflection, having a plurality of 45° angle prisms extending the length of the conduit to totally internally reflect the light as it travels along the length of the conduit. See, for example, U.S. Pat. Nos. 4,260,220; 4,805,984; 4,750,789; and 4,615,579.

In view of the disadvantages inherent in the presently known light poles, there is a need for an apparatus that transports light from a light source that can be located at or near ground level upward to a reflecting member, that distributes the light uniformly to the ground below. There is also a need for a reflective sheeting material that may, for example, be provided in a reflection chamber adapted to be provided at the top of a light conduit to reflect an area source of light emitted from the light conduit in a broad, uniformly distributed pattern.

SUMMARY OF THE INVENTION

The present invention provides a reflective sheeting material having a structured, reflective surface comprising a linear array of isosceles prism reflecting elements, the elements including a pair of reflective surfaces having an angle of about 120° therebetween. Each reflecting surface also forms a reflective groove with an adjacent reflective surface, the surfaces of the groove having an angle of about 120° therebetween.

The present invention also provides a reflective sheeting material having a structured reflective surface comprising an array of reflecting elements comprising a polyhedron having three parallelogram faces. The elements are shaped and arranged so that the following conditions exist: (a) the faces intersect at three external lines of intersection and at an element apex (b) each face also intersects with adjacent faces on two adjacent elements; (c) the three faces on three adjacent elements intersect along three internal lines of intersection forming a reflection valley; and (d) in use, a ray of incident light entering a valley strikes a face at an angle of about 33°–37° and reflects from the face approximately parallel to the other two faces and at an angle of about 67°–74° from the incident light.

The present invention also provides an apparatus, such as a light pole, for transporting light and reflecting the light in a broad, uniform pattern. The apparatus comprises (a) a columnar light conduit, for transporting light therealong, the conduit having a proximate end and a distal end; (b) a light source provided at the proximate end of the light conduit; and (c) a light distributing reflective member, such as the reflective sheeting material described above, comprising an array of repeating reflecting elements. The reflective member is positioned at the distal end of the light conduit so that the light exiting the distal end of the conduit is reflected in a broad, uniformly distributed pattern.

The present invention also provides a reflection chamber adapted to reflect an area source of light, such as from a light conduit, in a broad, uniformly distributed pattern. The reflection chamber comprises (a) a light inlet; (b) a reflecting member including a reflective sheeting material, such as those described above; and (c) at least one transparent wall portion to allow the reflected light to exit the reflection chamber.

DETAILED DESCRIPTION OF THE PRESENT INVENTION

Figure 1:
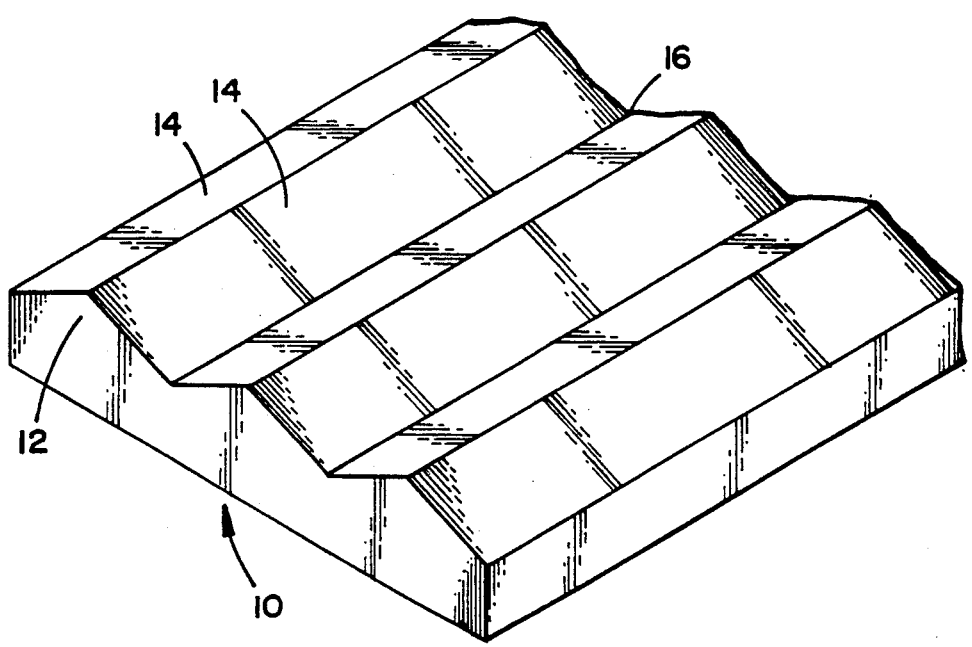
FIG. 1 is a fragmentary, plan view of one embodiment of the reflective sheeting material of the invention.

Referring to FIG. 1, a reflective sheeting material 10 is shown having a linear array of reflecting elements 12. The elements 12 each include a pair of reflective surfaces 14, each reflective surface 14 forming a reflective groove 16 with an adjacent reflective surface 14.

Figure 2:
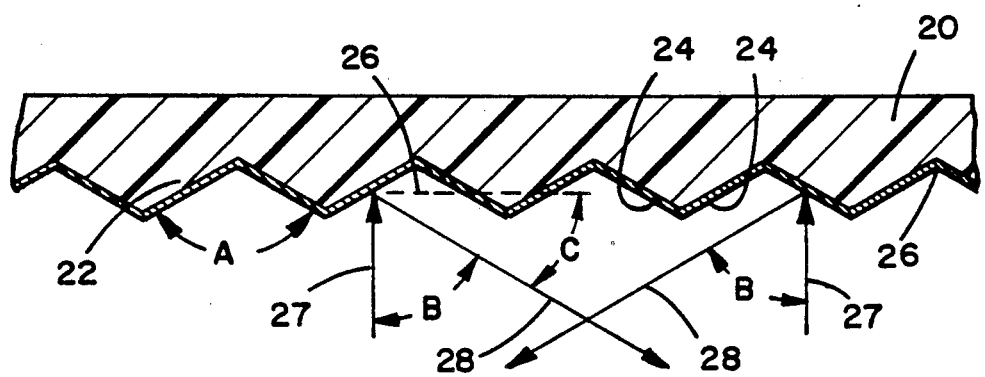
FIG. 2 is a vertical section of a reflective sheeting material like that shown in FIG. 1.

Referring to FIG. 2, a cross-section of a reflective sheeting material 20 is shown. The sheeting material 20 includes reflective elements 22 each having reflective surfaces 24. The reflective surfaces 24 form a reflective groove 26 therebetween. The angle between reflective surfaces 24 is "A." An incident ray 27 normal to the plane of the sheet material 20 strikes a reflective surface 24 and is reflected along reflected ray 28 parallel to the adjacent surface 24, at an angle "B" with the incident ray 27, and at an angle "C" with the plane of the sheet material 20'.

Figure 3A:
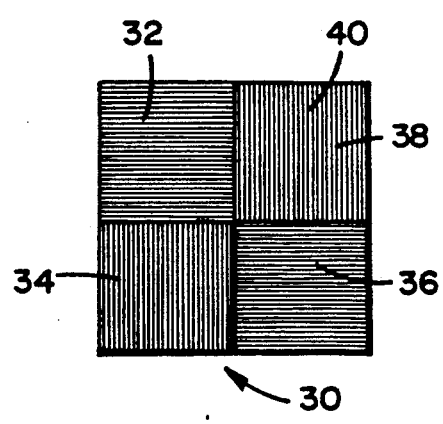
FIGS. 3A and 3B are top views of two embodiments including reflective sheeting material of the invention.

Referring to FIG. 3A, a reflective member 30 is shown having reflective sheeting portions 32, 34, 36, and 38. The reflective sheeting portions each contain a plurality of reflective grooves 40.

Figure 3B:
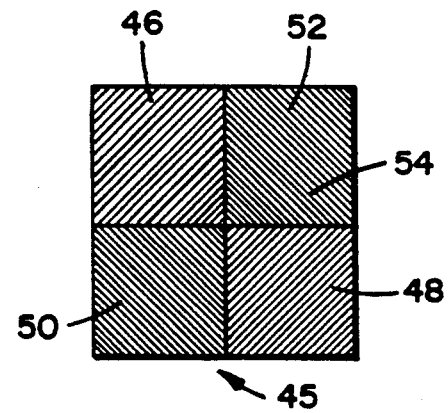

Referring to FIG. 3B, a reflective member 45 is shown having reflective sheeting portions 46, 48, 50, and 52. The reflective sheeting portions 46, 48, 50, and 52 include a plurality of reflective grooves 54.

Figure 4:
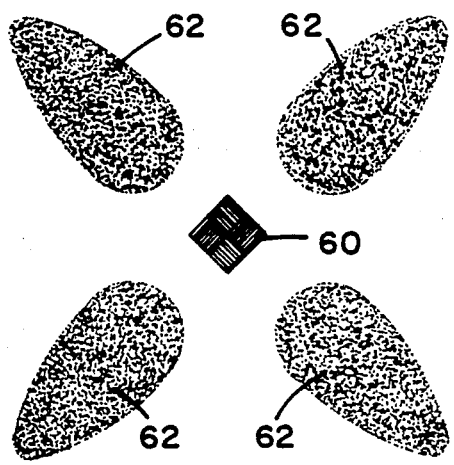
FIG. 4 is a schematic view of a reflective sheeting material of the invention and the footprint of light reflected from such material.

Referring to FIG. 4, a reflective member 60 is shown. The footprint portions 62 represent light reflected from the reflective member 60.

Figure 5:
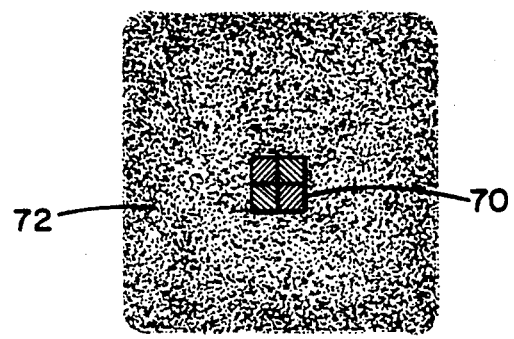
FIG. 5 is a schematic view of a reflective sheeting material of the invention and a footprint of reflected light from such sheeting material through a diffuser.

Referring to FIG. 5, a reflective member 70 is shown. The footprint 72 represents the light reflected from the reflective member 70 with the light passing through a diffuser.

Figure 6:
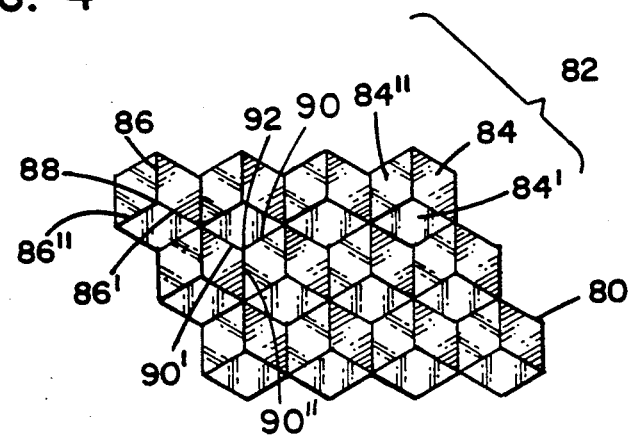
FIG. 6 is a fragmentary top view of an embodiment of reflective sheeting material of the invention.

Referring to FIG. 6, a reflective sheeting material 80 is shown. The sheeting material 80 includes a plurality of reflecting elements 82, each comprising faces 84, 84' and 84''. Faces 84, 84', 84'' intersect along external lines of intersection 86, 86', 86'', the lines of intersection intersecting at an element apex 88. Faces 84, 84', 84'' of three adjacent reflecting elements intersect each other along three internal lines of intersection 90, 90', 90'', forming reflection valleys 92.

Figure 7:
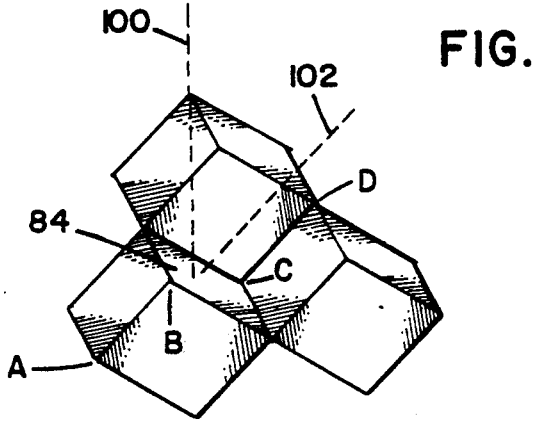
FIG. 7 is a fragmentary perspective view showing three polyhedron reflecting elements of the reflective sheeting material of FIG. 6.
Figure 8:
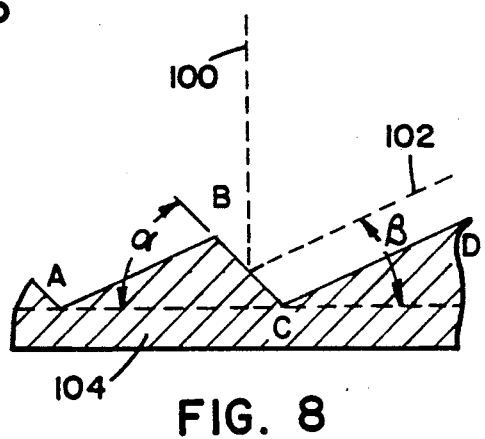
FIG. 8 is a sectional view along the plane A-B-C-D of FIG. 7.

Referring to FIGS. 7 and 8, in use, a ray of incident light 100 strikes a reflective face 84, 84', or 84'' and is reflected along a reflected ray 102. The face 84 is at an angle $\alpha$ with the plane of the reflective sheeting material 104. The reflected ray 102 is reflected at an angle $\beta$ with the plane of reflective sheeting material 104.

Figure 9:
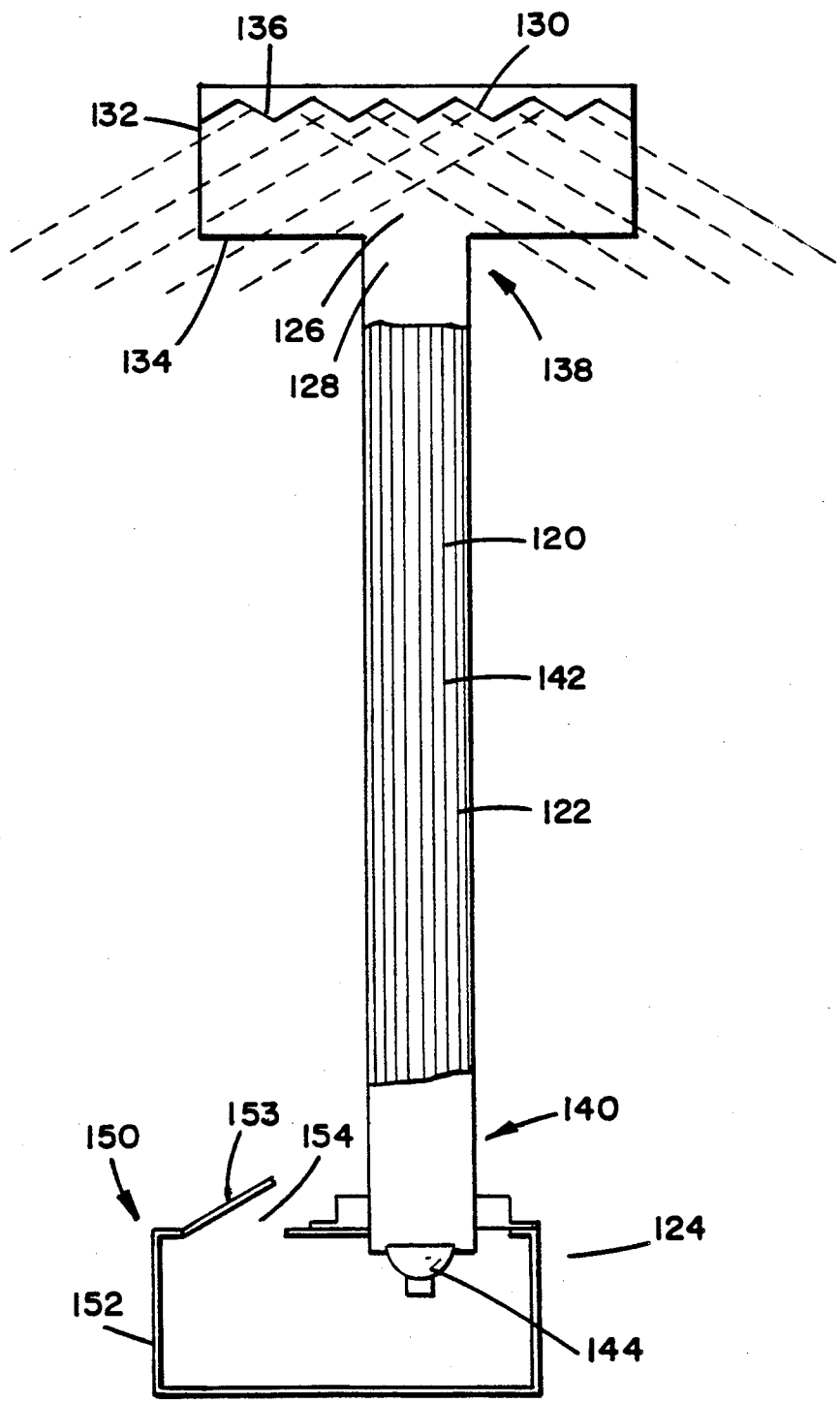
FIG. 9 is a schematic cross-section of a light pole of the invention.

Referring to FIG. 9, a pole light 120 is shown. The light pole 120 includes a columnar light conduit 122, a light source 124, and a reflection chamber 126. The reflection chamber 126 includes a light inlet 128, a reflecting member 130, sidewall portions 132, and bottom wall portions 134. The reflecting member 130 includes a plurality of reflecting elements 136. The columnar light conduit 122 includes a distal end 138, a proximate end 140, and a light transporting sheeting material 142. The light source 124 includes a light bulb 144. The light source 124 and the proximate end 140 of the conduit 122 is provided in a base portion 150. The base portion 150 includes an access box 152, having a door 153 and an access opening 154.

Reflective Sheeting Material

The reflective sheeting materials of the present invention are configured to reflect light in a broad, uniform pattern. The present invention provides two types of reflective sheeting material, one including a linear array of isosceles prism reflecting elements, and the second including an array of reflecting polyhedron elements, each having three parallelogram faces.

The isosceles prism reflecting elements form an angle of about 30° with the plane of the sheeting material. Thus, a ray of light will be reflected at an angle of 30° to the horizontal, and parallel to the adjacent face of an adjacent element.

The reflective sheeting material having polyhedron reflecting elements includes an array of reflection valleys formed by three faces of adjacent elements. A ray of incident light strikes a face of a reflection valley at an angle of about 33°-37°, and reflects from the face approximately parallel to the other two faces, and at an angle of about 67°-74° from the incident light. Thus, the reflected ray is reflected at an angle of about 16°-23° below the horizontal.

The polyhedron sheeting material preferably comprises elements each having three rhombus faces and being shaped and arranged so that the following conditions exist:

(a) the faces intersect at three external lines of intersection and at an element apex;

(b) the external lines of intersection each intersect at the apex at equal angles;

(c) each rhombus face also intersects with adjacent faces on two adjacent elements;

(d) the three rhombus faces of three adjacent elements intersect along three internal lines of intersection forming a reflection valley;

(e) each rhombus face forms an angle, alpha, with the plane of the sheet material, alpha being about 33°-37°;

(f) in use, a ray of incident light normal to the plane of the sheet material reflects from one of the three faces of a valley approximately parallel to the other two faces of the valley; and (g) the angle, beta, between a ray of reflected normal incident light and the plane of the sheet material is about 16°-23°.

It is preferred that the angle $\alpha$ be about 35°-36°, and that $\beta$ be about 19°-20°. It is also preferred that the sheeting material have an effective aperture of about 100%. When $\alpha = 35.3°$ and $\beta = 19.5°$ the reflective sheeting material exhibits 100.0% aperture to normal rays. Typically in use, the angle $\beta$ is the angle below the horizontal at which the light is reflected. A typical light pole will transport light in a path perpendicular to the ground. The plane of the reflective sheeting material is thus positioned so as to be approximately parallel to the ground. Light is reflected from the sheeting material back towards the ground at an angle $\beta$ below the horizontal plane of the sheeting material. The smaller the angle ($\beta$) below the horizontal at which the light is reflected, the further the light can be spread from the pole.

The reflective sheeting material of the present invention may be made from any suitable material. The structured reflective surface of the sheeting material is made from a suitable reflective material. Thus, the entire reflective material can be formed from aluminum or steel, that can be polished to provide a structured reflective surface. However, it is preferred that the reflective material be formed from a plastic material having a structured surface of the desired shape, with the structured surface metalized, such as vapor coated aluminum, to provide the reflective surface.

A suitable plastic material for forming the reflective sheeting material is preferably dimensionally stable, durable, weatherable, and readily formable into the desired configuration. Examples of suitable materials include acrylics, such as Plexiglass resin from Rohm and Haas; polycarbonates; polyethylene based ionomers, commercially available as "Surlyn", from E.I. DuPont de Nemours & Co.; polyesters; and cellulose acetate butyrates. The polymer may be clear or opaque as light is not transmitted therethrough, but is reflected from the reflectorized structured surface.

The reflective sheeting material may be prepared in a variety of ways including embossing, casting, stamping, or by other means of forming materials, in or with a transparent plastic material. After the structured surface has been formed in one planar surface of a plastic or other material, the surface can be metalized utilizing, a number of suitable metals, such as aluminum.

Reflection Chamber

The reflective sheeting material of the present invention is preferably provided in a reflection chamber adapted to be placed at the top of a light conduit to reflect an area source of light, emitted from the top of the light conduit, into a broad, uniformly distributed pattern. The reflection chamber may be designed in a wide variety of configurations to provide the desired footprint or pattern of light reflected onto the ground or other surface below the light pole. The reflective sheeting material is placed opposite the distal end of the light conduit with the structured reflective surface facing the light conduit so that the light exiting the light conduit is reflected in a broad, uniformly distributed pattern.

The reflecting member includes one or more portions of a reflective sheeting material arranged so as to reflect light into a desired footprint. For example, as shown in FIGS. 3A and 3B, the reflecting member may include four portions with the grooves of each portion aligned in a non-linear relation.

The reflection chamber also includes a light inlet adapted to engage the distal end of the light conduit and provide an opening into the reflection chamber to allow the area source of light being emitted from the distal end of the light conduit to radiate into the reflection chamber. The reflection chamber includes at least one transparent wall portion to allow the reflected light to exit the reflection chamber. The reflection chamber may be circular, square, triangular, hexagonal, octagonal, or any of a number of other shapes as desired. Thus, a wall portion may be a sidewall portion, a bottom wall portion, or other portion of the reflection chamber. For example, a wall portion may be a portion of the circumference of a circle or other shape. For example, if the light pole were designed to be used in a parking lot where g was to be reflected in all directions, the reflection chamber could be designed to have transparent walls on all sides.

The reflection chamber may also include one or more planar reflector wall portions for directing light in a desired direction. For example, for use along a roadway it is desirable to reflect the light being reflected from the reflecting member towards the roadway and not behind the light pole or along the side of the roadway. Thus, planar reflection surfaces may be provided so as to reflect light in a given direction.

In addition, diffusing wall panels may be provided to diffuse the light reflected from the reflective member into a more uniformly distributed pattern on the ground below (FIG. 5). These and other methods of reflecting and refracting light into desired patterns may be utilized in the reflection chamber to provide the desired footprint of light reflected from the reflective member.

Light Conduit

Totally internally reflecting conduits for transporting light from one place to another are known in the art. U.S. Pat. No. 4,805,984 (the '984 patent) describes such a light conduit and is incorporated herein by reference. See also, U.S. Pat. Nos. 4,615,579 and 4,750,798.

In use, a light conduit transports light from a light source, including both artificial or solar energy, and transports the light from one end of the conduit to the other. Light conduits, such as those described in the '984 patent, can transport light with very little loss of light. In addition, the light provided at the distal end of a conduit, such as that described in the '984 patent, is a linearly directed (semicolumnated) area source of light. An area source of light is made up of a large number of point sources of light. Thus, a single light bulb or multiple light bulbs at the proximate end of the light conduit will provide an integrated area source of light at the distal end of the conduit. The integrated area source is then reflected by the array of reflecting elements into a broad, uniformly distributed pattern.

Although there are a number of configurations of light conduits known in the art, light conduits such as those described in the '984 patent are preferred. A preferred light conduit will comprise a wall member of a transparent material, including a structured surface on one side and a smooth surface opposite the structured surface. At least a portion of the cross-section of the wall member lying in a smooth arcuate curve. For example, the wall member may have a substantially circular cross-section with the smooth surface disposed on the inner side of the wall member and the structured surface on the outside of the wall member. The structured surface includes a linear array of substantially right angled isosceles prisms arranged side-by-side, with the perpendicular sides of the prisms making an angle of approximately 45° with the tangent to the smooth surface opposite the structured surface. The prisms typically run parallel to the axis of the wall member extending continuously from one end to the other. In use, a predetermined portion of the light entering the light conduit within an acceptable angular range, is contained by total internal reflection as it travels along from the proximate end to the distal end of the light conduit.

Light Pole

The present invention also provides an apparatus for transporting light and reflecting the light in a broad, uniform pattern. Such an apparatus may be used as, for example, a light pole positioned along a roadway, highway, or a parking lot. A light pole will include a light source typically provided in a base portion. The base portion is adapted to be positioned either submerged in, or on top of, the ground. A columnar light conduit, such as that described in the '984 patent, extends from the base portion, typically positioned so as to extend vertically from the ground. It is preferable that the base portion include an accessible box portion for ease of access to the light source. The light source may include one or more light bulbs or other sources of light. Thus, the light bulb or bulbs may be easily replaced by one person, without the need for ladders, hoists, or other apparatus typically required to change a bulb positioned on top of a light pole.

The light emitted from the light source at the base or proximate end of the light conduit is transported through the light conduit and is provided as an area source of light at the distal end of the light conduit. The light could also be located elsewhere in the light conduit, as desired, and proximate end, as used herein, will refer to the end of that portion of light conduit where the light source is located.

A light distributing reflective member comprising an array of repeating reflective elements is positioned at the distal end of the light conduit so that the light exiting the distal end of the conduit is reflected in a broad, uniformly distributed pattern. Examples of light distributing reflective members include the reflective sheet materials described herein. The reflective member may comprise two or more linear arrays of reflecting elements disposed in different linear relation to reflect the light into a particular uniformly distributed pattern. (For example, see FIGS. 3A and 3B.)

The reflective member is typically provided in a reflection chamber which further aids in the reflection and refraction of the reflected light into a desired footprint. By selecting suitable combinations of reflecting elements, planar reflectors, and defusing panels, a wide variety of broad, uniformly distributed patterns of light or footprints may be provided. Footprint refers to the pattern of light that is projected on the ground or other surface surrounding the pole.

By use of the apparatus of the present invention and positioning such apparatus, or light poles, in groups or clusters, the ratio of illumina that can be obtained is superior to that previously known. Ratios of illumination of 7:1 have previously been considered quite uniform. Ratios of illumination of 100-1000:1 are not uncommon. A group of light poles of the present invention can be designed so as to provide a ratio of illumination of less than about 3:1, and can be made to provide a ratio of illumination of less than about 2:1.

In addition to providing superior ratios of illumination to known light poles, pole lights of the present invention are able to be made of plastic materials, instead of metal, thereby providing savings of cost, and providing increased safety to, for example, the motorist. In addition, light poles of the present invention can be made to be approximately 6 meters tall compared to previous light poles typically 15-18 meters in height, and produce comparable footprints.

An added feature that can be provided as part of the apparatus of the invention is a light emitting opening provided in the wall member of the light conduit. The light emitting opening or openings can be provided in the shape of letters, words, or other shapes. For example, "EXIT" can be illuminated in the side wall of a pole positioned at an exit ramp on a highway. The loss of light from such an opening can be minimal, with a sufficient quantity of light remaining to be reflected by the reflecting element.

I claim:

1. A specularly reflective sheeting material having a structured reflective surface comprising a linear array of isosceles prism reflecting elements, each of said elements including a pair of reflecting surfaces having an angle of about 120° therebetween, each reflective surface also forming a reflective groove with an adjacent reflective surface, the surfaces of said groove having an angle of about 120° therebetween.

2. The sheeting material of claim 1, wherein said structured reflective surface is metalized.

3. The sheeting material of claim 1, having an effective aperture of about 100%.

4. A reflective sheeting material having a structured reflective surface comprising an array of reflecting elements, each of said elements comprising a polyhedron having three parallelogram faces, and being shaped and arranged so that the following conditions exist:
   (a) said faces intersect at three external lines of intersection and at an element apex;
   (b) each face also intersects with adjacent faces on two adjacent elements;
   (c) three faces on three adjacent elements intersect along three adjacent internal lines of intersection forming a reflection valley; and
   (d) in use, a ray of incident light entering the valley and striking a face of the three faces at an angle of about 33°-37° is reflected from the face approximately parallel to the other two faces of the valley and at an angle of about 67°-74° to the incident light.

5. The sheeting material of claim 4 wherein each of said elements comprises a polyhedron having three rhombus faces and being shaped and arranged so that the following conditions exist:
   (a) said rhombus faces intersect at three external lines of intersection and at an element apex;
   (b) said external lines of intersection each intersect at the apex at equal angles;
   (c) each rhombus face also intersects with adjacent faces on two adjacent elements;
   (d) the three rhomus faces of three adjacent elements intersect along three internal lines of intersection forming a reflection valley;
   (e) each rhombus face forms an angle, $\alpha$, with the plane of the sheeting material, $\alpha$ being about 33°-37°;
   (f) in use, a ray of incident light normal to the plane of the sheeting material reflects from one of the three faces of the valley approximately parallel to the other two faces of the valley; and
   (g) the angle, $\beta$, between a ray of reflected normal incident light and the plane of the sheeting material is about 16°-23°.

6. The sheeting material of claim 5, wherein $\alpha$ is about 35°-36° and $\beta$ is about 19°-20°.

7. The sheeting material of claim 4, wherein said structured reflective surface is metalized.

8. A reflection chamber adapted to reflect an area source of light in a broad, uniformly distributed pattern, said chamber comprising:
   (a) a light inlet;
   (b) a reflecting member including a reflective sheeting material of claim 4; and
   (c) at least one transparent wall portion to allow the reflected light to exit the reflection chamber.

9. The reflection chamber of claim 8, further including one or more planar reflector wall portions for directing the light reflected from the reflecting member.

10. The reflection chamber of claim 8, further including at least one light diffusing wall panel to diffuse the light reflected from the reflecting member into a uniformly distributed pattern.

11. An apparatus for transporting light and reflecting the light in a broad, uniform pattern, said apparatus comprising:
   (a) a columnar light conduit, for transporting light there along, said conduit having a proximate end and a distal end;
   (b) a light source provided at the proximate end of the light conduit; and
   (c) a light distributing reflective member comprising at least one linear array of isosceles prism reflecting elements, said elements each including a pair of reflective surfaces having an angle of about 120° therebetween, each reflective surface also forming a reflective groove with an adjacent reflective surface, said groove having an angle of about 120° between the adjacent reflective surfaces, said member positioned at the distal end of said light conduit so that the light exiting the distal end of the conduit is reflected in a broad, uniformly distributed pattern.

12. The apparatus of claim 11, wherein said columnar light conduit for transporting light there along comprises a wall member of a transparent material, said wall member including a structured surface on one side and a smooth surface opposite said structured surface on the other side, at least a portion of the cross-section of said wall member lying in a smooth arcuate curve, said structured surface having a linear array of substantially right angled isosceles prisms arranged side-by-side, the perpendicular sides of said prisms making an angle of approximately 45° with the tangent to said smooth surface opposite said structured surface, so that a predetermined portion of the light entering the light conduit within an acceptable angular range, is contained by total internal reflection as it travels along from the proximate end to the distal end of the light conduit.

13. The apparatus of claim 12, wherein said wall member is substantially circular in cross-section and said smooth surface is disposed on the inner side of said wall member and said prisms run parallel to the axis of said wall member.

14. The apparatus of claim 11, wherein said reflective member comprises two or more linear arrays of reflecting elements disposed in differing linear relation to reflect the light into a particular, uniformly distributed pattern.

15. An apparatus for transporting light and reflecting the light in a broad, uniform pattern, said apparatus comprising:
   1. a columnar light conduit, for transporting light there along, said conduit having a proximate end and a distal end;
   2. a light source provided at the proximate end of the light conduit; and
   3. a light distributing reflective member comprising an array of repeating reflecting elements, each of said elements comprising a polyhedron having three parallelogram faces, and being shaped and arranged so that the following conditions exist:
      (a) said faces intersect at three external lines of intersection and at an element apex;
      (b) each face also intersects with adjacent faces on two adjacent elements;
      (c) the three faces of the adjacent elements intersect along three internal lines of intersection forming a reflection valley;
      (d) in use, a ray of incident light entering said reflection valley and striking a face at an angle of about 33°–37° is reflected from the face approximately parallel to the other two faces of the valley and at an angle of about 67°–74° to the incident light said reflective member positioned at the distal end of said light conduit so that the light exiting the distal end of the conduit is reflected in a broad, uniformly distributed pattern.

16. The apparatus of claim 11, which is a light pole having a light source provided in a base portion adapted to be on top of or submerged in the ground with the columnar conduit extending vertically from the ground.

17. The apparatus of claim 16, wherein said light source comprises multiple light bulbs and an integrated area source of light is provided at the distal end of the conduit.

18. The apparatus of claim 11, wherein the reflective member is provided in a reflection chamber comprising: (a) a light inlet positioned above the distal end of said conduit to receive light from said conduit; (b) a reflecting member including a repeating pattern of reflecting elements; and (c) at least one transparent wall portion to allow the reflected light to exit said reflection chamber.

19. The apparatus or claim 18, wherein said reflection chamber further includes one or more planar reflector wall portions for directing the light reflected from the reflecting member.

20. The apparatus or claim 18, wherein said reflection chamber further includes at least one light diffusing panel to diffuse the light reflected from the reflecting member into a uniformly distributed pattern.

21. A reflection chamber comprising an enclosure having:
   (a) a light inlet;
   (b) a reflecting member comprising a reflective sheeting material having a structured reflective surface comprising a linear array of isosceles prism reflecting elements, each of said elements including a pair of reflecting surfaces having an angle of about 120° therebetween, each reflecting surface also forming a reflective groove with an adjacent reflecting surface, said groove having an included angle of about 120°; and
   (c) at least one transparent wall portion to allow light reflected by said reflecting surfaces to exit the reflection chamber.

22. A reflector comprising at least two portions of reflective sheeting material, each portion having a structured reflective surface comprising a linear array of isosceles prism reflective elements, each of said elements including a pair of reflecting surfaces having an angle of about 120° therebetween, each reflecting surface also forming a reflective groove with an adjacent reflecting surface, the surfaces of said groove having an included angle of about 120°, wherein the grooves of one of said portions are aligned in a non-parallel relationship to the grooves of another portion.

23. The reflector of claim 22 comprising at least four portions of grooved reflective sheeting, said portions being arranged so that the grooves of selected pairs of adjacent portions are oriented at about 90° to each other.

* * * * *

UNITED STATES PATENT AND TRADEMARK OFFICE
CERTIFICATE OF CORRECTION

PATENT NO. : 4,989,948

DATED : February 5, 1991

INVENTOR(S) : John F. Dreyer

It is certified that error appears in the above-identified patent and that said Letters Patent is hereby corrected as shown below:

Col. 6, line 6, "g" should read --light--

Signed and Sealed this

First Day of February, 1994

Attest:

BRUCE LEHMAN

Attesting Officer

Commissioner of Patents and Trademarks